US012332800B2

(12) United States Patent
Sivasankaran

(10) Patent No.: US 12,332,800 B2
(45) Date of Patent: Jun. 17, 2025

(54) TRANSPARENT HOST MEMORY BUFFER

(71) Applicant: Western Digital Technologies, Inc., San Jose, CA (US)

(72) Inventor: Vijay Sivasankaran, Dublin, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/358,418

(22) Filed: Jul. 25, 2023

(65) Prior Publication Data

US 2024/0078184 A1    Mar. 7, 2024

Related U.S. Application Data

(60) Provisional application No. 63/403,971, filed on Sep. 6, 2022.

(51) Int. Cl.
G06F 12/0873    (2016.01)
(52) U.S. Cl.
CPC ................. G06F 12/0873 (2013.01)
(58) Field of Classification Search
CPC .................................................. G06F 12/0873
See application file for complete search history.

(56) References Cited

U.S. PATENT DOCUMENTS

| 2016/0246726 | A1* | 8/2016 | Hahn | G06F 3/0613 |
| 2016/0274797 | A1* | 9/2016 | Hahn | G06F 3/0626 |
| 2018/0067684 | A1* | 3/2018 | Benisty | G11C 29/52 |
| 2021/0286623 | A1* | 9/2021 | Navon | G06F 11/0727 |
| 2021/0334200 | A1* | 10/2021 | Xu | G06F 13/4221 |
| 2022/0358015 | A1* | 11/2022 | Shivanand | G06F 11/1088 |

\* cited by examiner

*Primary Examiner* — Prasith Thammavong
(74) *Attorney, Agent, or Firm* — PATTERSON + SHERIDAN, LLP

(57) ABSTRACT

The present disclosure generally relates to utilizing a transparent host memory buffer (HMB) where the host device is granted access to the HMB to obtain data from a mapping table. The data storage device stores the mapping table in HMB and then allows the host device to view the mapping table and retrieve information. The host device sends a command to the data storage device that includes not only a read command, but also mapping table info specific to the read command. Additionally, an indication of the mapping table version from where the information is also provided. The data storage device, upon receiving the command, confirms the version of the information is the most recent version and then, if confirmed, utilizes the mapping information provided with the command. In so doing, accessing the HMB after receiving the command will not be necessary.

11 Claims, 4 Drawing Sheets

TRANSPARENT HOST MEMORY BUFFER

CROSS-REFERENCE TO RELATED APPLICATIONS

This application claims benefit of U.S. Provisional Patent Application Ser. No. 63/403,971, filed Sep. 6, 2022, which is herein incorporated by reference.

BACKGROUND OF THE DISCLOSURE

Field of the Disclosure

Embodiments of the present disclosure generally relate to allowing a host device to access a host memory buffer (HMB).

Description of the Related Art

Data storage devices include memory devices for storing data received from a host device. The data is stored in a physical location in memory device. The physical location has an address referred to as a physical block address (PBA). The controller of the data storage device tracks the PBA logically using a logical block address (LBA). Hence, there is a manner of tracking the correspondence between PBA and LBA. The correspondence is referred to as a mapping table or a LBA to PBA (L2P) table.

The L2P table is updated frequently due to new write command executions as well as garbage collection activities. Hence, the L2P table is oftentimes stored in readily accessible memory such as volatile memory or even within the data storage device controller itself such as in dynamic random access memory (DRAM).

As storage capacity of the memory devices increases, naturally the L2P table size increases as well. In order to store larger and larger L2P tables in DRAM, larger DRAM is needed, which is expensive. Therefore, host memory buffers (HMBs) have become an attractive option. HMB is a store area within the host device that the host device allocates for the data storage device to use. HMB can be used to cache part or all of the L2P table to enhance read/write performance and potentially even remove a need for DRAM in the controller (e.g., create DRAM-less data storage devices).

A random read/write command may involve accessing the memory device twice. The first access is to read the L2P table and the second access is to read the actual LBA. DRAM-less controllers do not have enough internal RAM memory to cache all of the L2P tables. Hence, HMB can be used to avoid some the mapping table reads by caching some of the tables in HMB.

Most real world workloads are low queue depth (QD), a mix of reads/writes, and span less over <128 GB range. For the low QD operations, the HMB access occurs in the foreground and there are not enough operations to hide the peripheral component interconnect express (PCIe) latencies. HMB access latencies over PCIe is typically on the order of 2-8 us. 8 us is a significant amount of time considering memory device access time is about 25 us (i.e., HMB access is about 30%). Memory device (e.g., NAND media) access time scales over time, but the PCIe does not scale with the memory device.

Therefore, there is a need in the art for more efficient mapping table access.

SUMMARY OF THE DISCLOSURE

The present disclosure generally relates to utilizing a transparent host memory buffer (HMB) where the host device is granted access to the HMB to obtain data from a mapping table. The data storage device stores the mapping table in HMB and then allows the host device to view the mapping table and retrieve information. The host device sends a command to the data storage device that includes not only a read command, but also mapping table info specific to the read command. Additionally, an indication of the mapping table signature from where the information is also provided. The data storage device, upon receiving the command, confirms the signature of the data is as expected and then, if confirmed, utilizes the mapping information provided with the command. In so doing, accessing the HMB after receiving the command will not be necessary.

In one embodiment, a data storage device comprises: a memory device; and a controller coupled to the memory device, wherein the controller is configured to: receive a command from a host device, wherein the command includes an indication of data to be written/read and supplemental information, wherein the supplemental information is information obtained from a host memory buffer (HMB); and execute the command.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to utilizing a transparent host memory buffer (HMB) where the host device is granted access to the HMB to obtain data from a mapping table. The data storage device stores the mapping table in HMB and then allows the host device to view the mapping table and retrieve information. The host device sends a command to the data storage device that includes not only an IO command, but also mapping table info specific to the read command. Additionally, an indication of the mapping table signature may also be provided. The data storage device, upon receiving the command, confirms the signature of the information is as expected and then, if confirmed, utilizes the mapping information provided with the command. In so doing, accessing the HMB after receiving the command will not be necessary.

Figure 1:
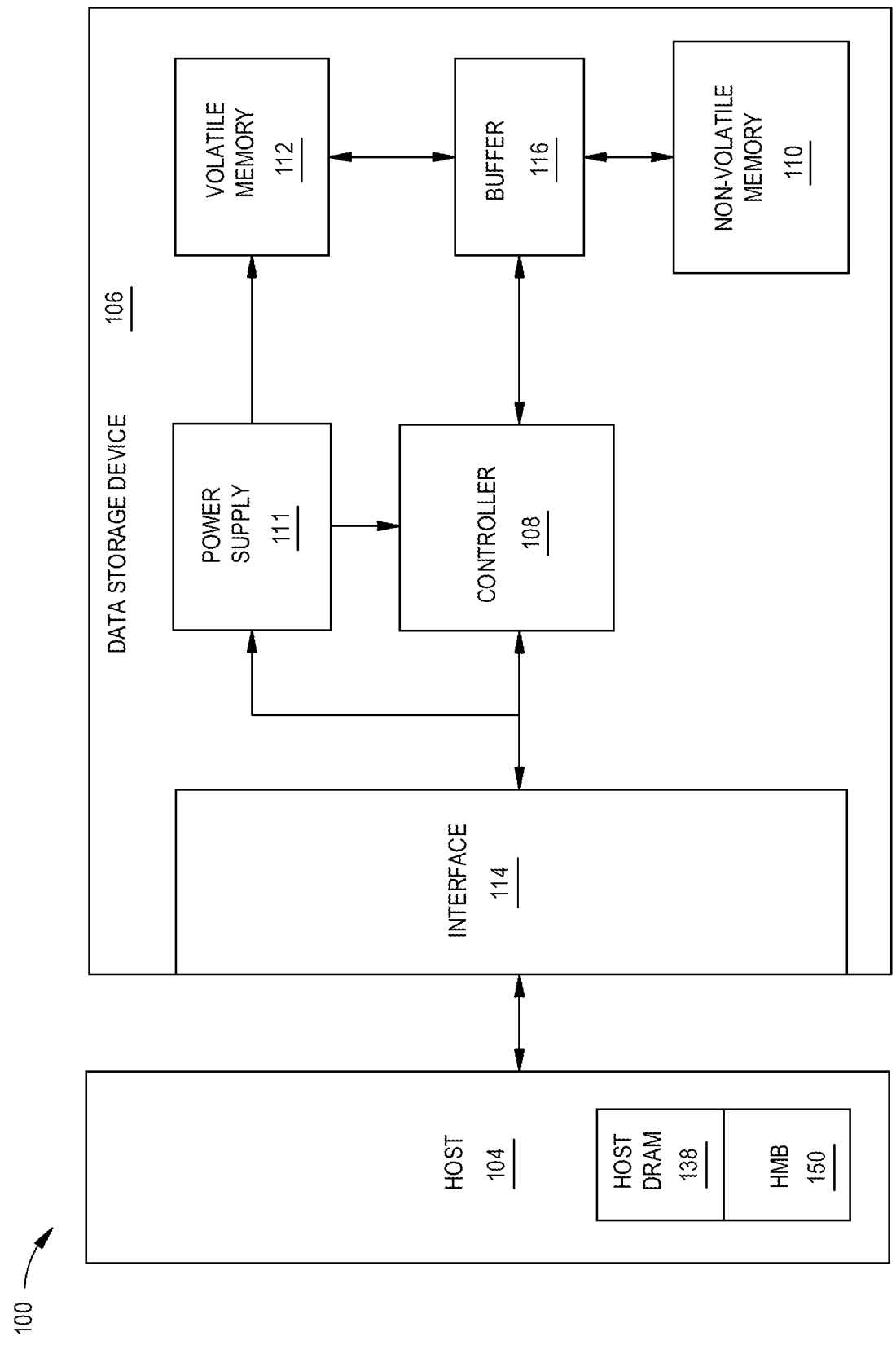
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138 having a host memory buffer (HMB) 150. In the embodiment shown in FIG. 1, the data storage device 106 and controller 108 are DRAM-less meaning that there is no DRAM present. However, it is contemplated that DRAM may be present in the data storage device 106 and/or controller 108 specifically. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

When a command arrives from a host device, logical block address (LBA) to physical block address (PBA) (L2P) tables are used for mapping the location of the data of the command. For a write command, a new entry is created in the table indicating where the new data is stored. For a read command, the table contains the location of the data to be read. The L2P table may be cached in the controller of the data storage device, but also may be stored in HMB or the physical media (i.e., memory device). For the read command, the controller processes the read command by checking the table for the location of the data. If the table is in physical memory, then retrieving the table takes some time. If the table is in the controller, the information can be obtained faster than if the table is in the physical memory. However, storing the table in the controller involves a lot of store space and hence, the table is oftentimes stored in the HMB. Therefore, for the read command to be processed, the controller will typically retrieve information from the table in HMB.

Figure 2:
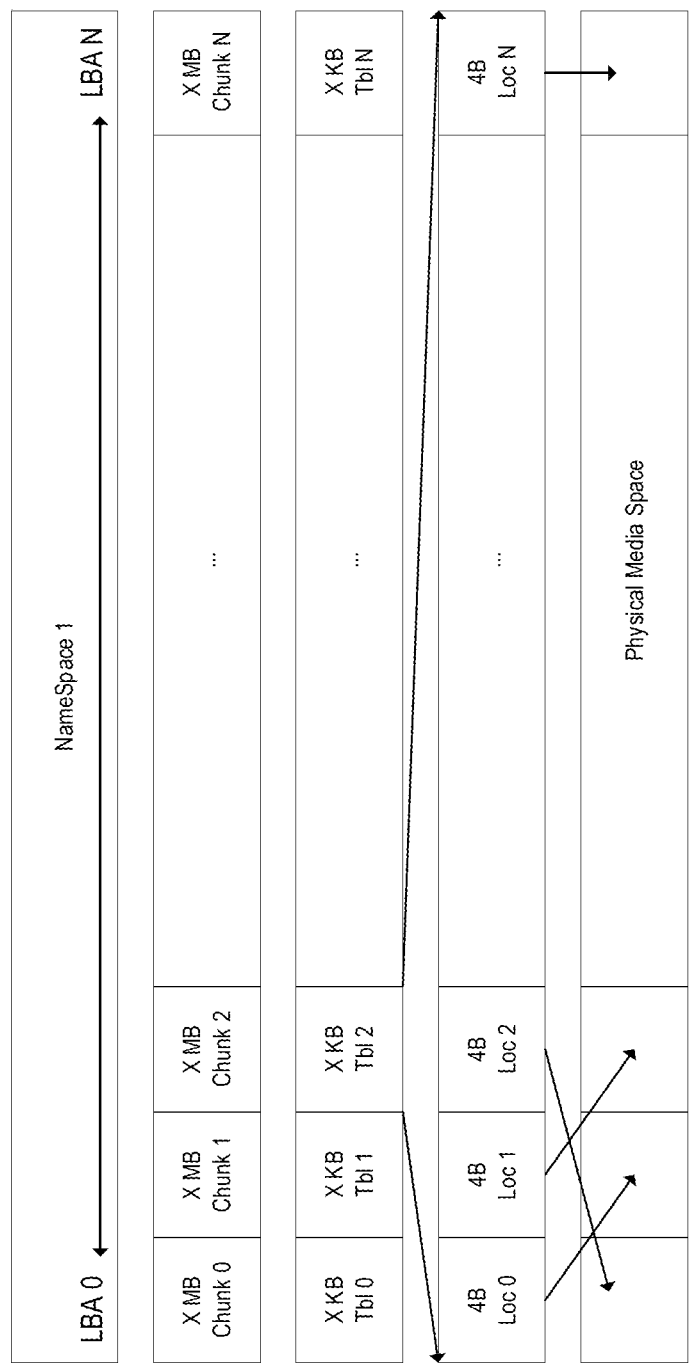
FIG. 2 is a schematic illustration of data mapping according to one embodiment.

FIG. 2 is a schematic illustration of data mapping according to one embodiment. As shown in FIG. 2, a namespace such as NameSpace 1 holds LBAs such as LBA 0 through LBA N which refers to numerous data chunks (i.e., Chunk 0 through Chunk N) of X MB which refers to multiple tables (i.e., Tbl 0 through Tbl N) of X KB referring to addresses of locations (i.e., Loc 0 through Loc N) that are 4 B of the physical media space. The tables (i.e., Tbl 0-Tbl N) may be stored in HMB or cached in the controller or even stored in physical memory. If the table needed to process the read command is in physical memory, it will take some time to retrieve the table. If the table is in cache, the cache utilizes a lot of memory. Therefore, the table may be in HMB. If the table is in HMB, then when the command arrives, the controller needs to obtain the information from the table in HMB, which takes time. Allowing the host device to see the HMB, but not edit the HMB, is the solution.

Rather than increase DRAM in the controller, the HMB can be leveraged for storage, and the host device can look at the table in the HMB and provide the information from the table along with the read command. In such a manner, the HMB is a transparent HMB because the HMB is transparent to the host device so that the host device can read information from the table stored in HMB and provide the information along with the read command. Because the host device sends the table information with the read command, the controller does not need to retrieve the information from HMB and hence, saves 2-8 us and reduces latency while improving performance. Furthermore, a benefit is that there is no need for a DRAM in the controller because the HMB will be sufficient for storing the tables.

In operation, the data storage device indicates to the host device the existence of the transparent HMB feature. A log page is then used to export the table of content (TOC) size and the table entry for each namespace (NS) supported by the data storage device. For example, a 4 TB drive with 1 NS and mapping table entry size of 64K would indicate a TOC size of 64 KB, 64K table size, 4 Byte table entries, the TOC HMB ID, and Offset. Each entry in the TOC corresponds to a 64 MB contiguous region in the NS (logical address) and points to the table if present. Tables that are cached in HMB have the HMB ID and offset in the TOC (4 Bytes). Each entry in the table corresponds to a 4 k region.

Input/output (IO) operations are indexed into the TOC and then the table if the table is cached. The host device then sends, with the command, an entry, which could be 4-8 bytes, along with the command. The entry includes the signature version of the table found in HMB as well as the specific entry from the table. Coherency across writes and reads is maintained by the data storage device. Reads are sent to the drive after the write is acknowledged by the host and returns recent data. Simultaneous writes/reads behave as captured in the NVMe specification. The process reduces latency for read-world applications and benchmarks from a few ms for large range workloads to a few us. The process also reduces the need for DRAM SSDs for both client and log structured enterprise storage environments.

There is no need for the host device to maintain the state in the host software stack, and no write operations to the HMB by the host device. The host sends, along with the read/write command, a signature (e.g., 4 bytes) from either the TOC or the table and an entry from the table (e.g., 4 bytes). The data storage device then checks if the signature identified in the command is as per the expectations of drive. If the signature is valid, the data storage device uses the entry provided with the command, but if the signature is invalid, then the data storage device fetches the latest entry from another location.

Figure 3:
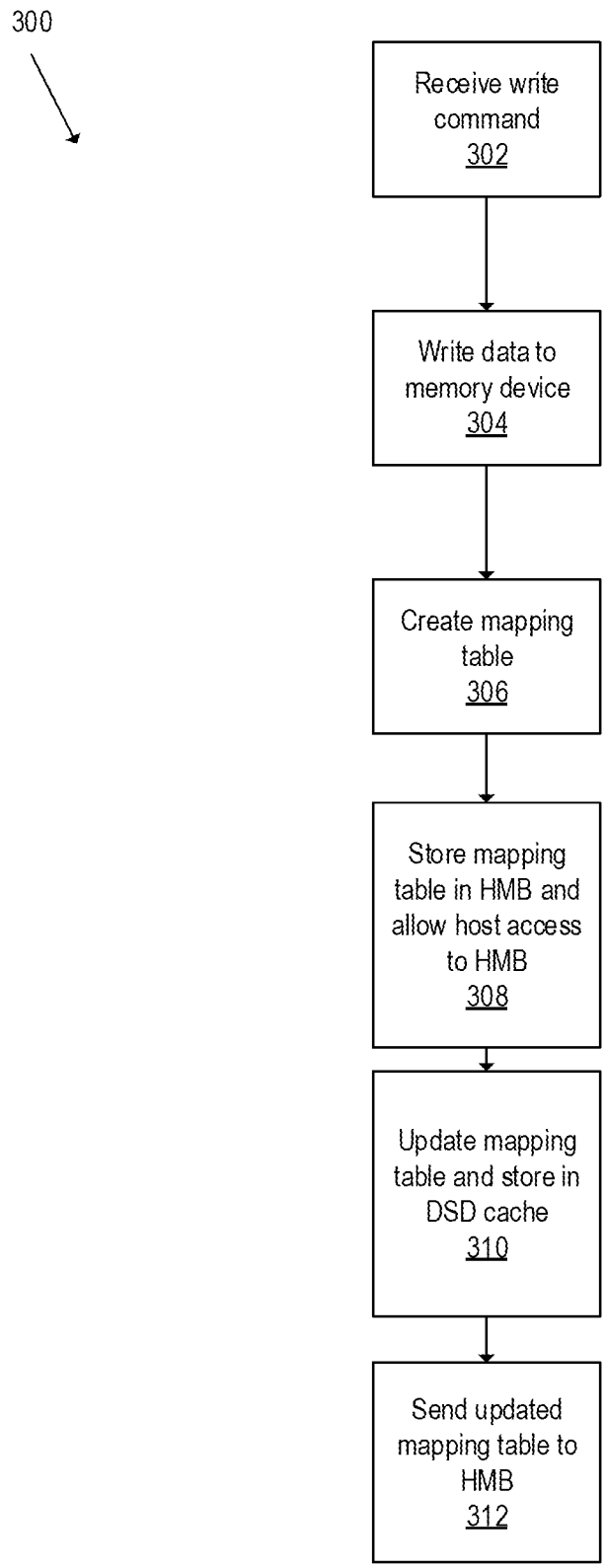
FIG. 3 is a flowchart illustrating creating a transparent host memory buffer (HMB) according to one embodiment.

FIG. 3 is a flowchart 300 illustrating creating a transparent HMB according to one embodiment. Initially, a write command is received at 302 and the data associated with the write command is written to the memory device at 304. If a mapping table does not already exist, a mapping table is then created at 306. The mapping table is then stored in HMB and the host is allowed access to the HMB for viewing purposes and retrieval of information therefrom at 308. As updates occur, the table is updated and stored in the data storage device cache at 310 and periodically the updated table is send to HMB at 312.

In one embodiment, the data storage device receives a command from a host device. If a write command, the data will be written to the memory device of the data storage device, and an entry of the physical location of the data will be added to a mapping table or the entry will be an entry in a new mapping table. The mapping table will be stored in one or more locations. One location is the memory device itself which is beneficial in case of a power loss event. Another location is the HMB. Since the HMB could become inaccessible due to various factors not discussed here, the table may also be stored in cache. Typically if stored in cache, a portion of the table is stored in cache rather than the entire table(s). Regardless, the mapping table may be stored in one of more location. If the location is HMB, then less storage space is needed in the data storage device and hence, storing in HMB is an attractive option for mapping table storage. When storing the mapping table in HMB, the version of the table is also stored in HMB to identify the mapping table version. Mapping tables can be updated from time to time, but the updates need not necessarily be immediately delivered to HMB. Hence, there is potential for the version of the mapping table in HMB to not be current. Thus, the mapping table is stored in HMB along with an indication of the mapping table version.

Figure 4:
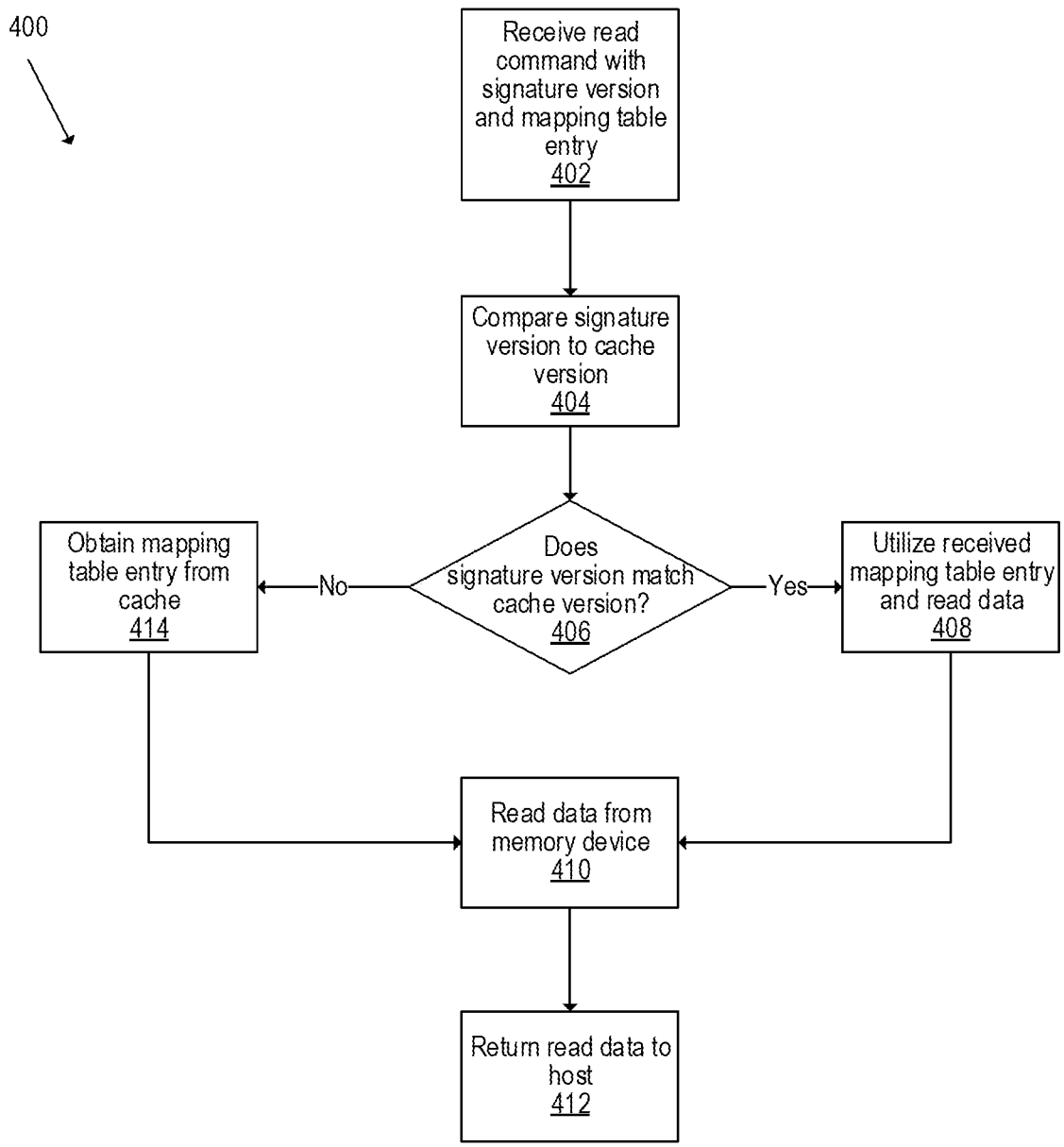
FIG. 4 is a flowchart illustrating utilizing a transparent HMB according to one embodiment.

FIG. 4 is a flowchart 400 illustrating utilizing a transparent HMB according to one embodiment. Initially, a read command is received in 402, and the read command includes a signature version and well as a mapping table entry from the HMB. The signature is compared to the signature inside drive at 404 and a determination is made at 406 regarding whether the signature is as expected. If the signature is valid, then at 408, the mapping table entry received with the read command is used and the data is read from the memory device at 410 and returned to the host device at 412. If the signature is invalid 406, then the mapping information is obtained from cache or the memory device and the data is read from the memory device at 410 and returned to the host device at 412.

In terms of mapping table operation, the data storage device is responsible for updating the mapping table. The updates occur each time the physical location of data is changed or new data is stored in the memory device. For mapping tables stored in HMB, the controller will eventually update the mapping table in HMB and include an indication of the version of the mapping table. Notably, the host device will not update anything in the HMB. The host device will simply be able to see/read information from the mapping table and attach the seen/read information to the read command. Another way to state the principle is that the host device will have read access only to the HMB. We preparing a command to send to the data storage device, the host device will consult the HMB to read from the existing mapping tables to find mapping information for the data to be read. The host device will attach the found mapping information to the read command and also attach an indication of the version of the mapping table from which the mapping information was obtained. Upon gathering the mapping information and mapping table version, the read command is ready for the data storage device.

In one embodiment, data in the memory device is to be read. When the read command arrives, the read command includes additional information from the host. The additional information is in two parts. The first part is mapping table information from a mapping table stored in HMB. The second part is an indication of the version of the mapping table stored in HMB. The data storage device confirms whether the version in the additional information matches the current mapping table version. If there is a match, then the data storage device can immediately fetch the data from the memory device without a need to retrieve mapping table information from any location including HMB. If there is no match, then the data storage receive will obtain the mapping information from a location that is not the additional information. In so doing, the data storage device will thus ignore the additional information that arrived with the read command.

By allowing a host device to view a mapping table in HMB, 10 latency for real world applications and benchmarks for large range workloads is reduced. More specifically, performance and latency for large range workloads can be similar to small range workloads. Any need for DRAM SSDs (i.e., SSD with DRAM in the controller) is reduced because the client workload spans across the full range.

In one embodiment, a data storage device comprises: a memory device; and a controller coupled to the memory device, wherein the controller is configured to: receive a command from a host device, wherein the command includes an indication of data to be written/read and supplemental information, wherein the supplemental information is information obtained from a host memory buffer (HMB); and execute the command. The command is a read command. The controller is further configured to store a mapping table in the HMB. The mapping table includes a version indication. The supplemental information includes mapping information and version indication. Version indication is an indication of the version of a mapping table stored in HMB. The controller is configured to determine whether the indication of the version reflects a current version of a mapping table. The controller is configured to utilize the mapping information from the supplemental information upon determining the current version matches the indication of the version. The controller is configured to ignore the mapping information from the supplemental information upon determining the current version does not match the indication of the version. The controller is configured to retrieve mapping information from a location different than the supplemental information upon determining the current version does not match the indication of the version.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, wherein the controller is configured to:
   grant a host device access to a host memory buffer (HMB), wherein the host memory buffer contains a mapping table;
   receive a command from the host device, wherein the command includes an indication of data to be written/read and supplemental information, wherein the supplemental information is information obtained from the HMB, and wherein the supplemental information contains mapping information from the mapping table specific to the command, wherein the supplemental information includes a signature version;
   compare the signature version to a cache version from cache;
   determine that the signature version and cache version do not match in the comparing;
   obtain the mapping information for the command from the cache based upon the determining; and
   execute the command using the mapping information obtained from the cache.

2. The data storage device of claim 1, wherein the command is a read command.

3. The data storage device of claim 1, wherein the controller is further configured to store the mapping table in the HMB.

4. The data storage device of claim 3, wherein the mapping table includes a version indication.

5. The data storage device of claim 1, wherein the controller is configured to ignore the information from the mapping table from the supplemental information upon determining the signature version does not match of the cache version.

6. The data storage device of claim 1, wherein the command is a read command.

7. The data storage device of claim 1, wherein the command is a write command and wherein the controller is configured to write data to the memory device.

8. The data storage device of claim 7, wherein the controller is configured to create the mapping table.

9. The data storage device of claim 8, wherein the controller is configured to store the mapping table in the HMB and allow the host device to access the mapping table in the HMB.

10. The data storage device of claim 9, wherein the controller is configured to update the mapping table and store the updated mapping table in cache.

11. The data storage device of claim 10, wherein the controller is configured to send the updated mapping table to the HMB.

* * * * *